United States Patent [19]

Robinson

[11] Patent Number: 4,695,501
[45] Date of Patent: Sep. 22, 1987

[54] THERMOFORMABLE COMPOSITE ARTICLES

[75] Inventor: Leonard W. Robinson, Trenton, Mich.

[73] Assignee: Fibre Converters, Inc., Three Rivers, Mich.

[21] Appl. No.: 598,655

[22] Filed: Apr. 10, 1984

[51] Int. Cl.[4] .......................... B32B 5/18; B32B 5/28; B32B 5/32; B32B 7/12
[52] U.S. Cl. ..................................... 428/159; 428/166; 428/198; 428/246; 428/248; 428/252; 428/287; 428/316.6; 428/317.1; 428/319.3; 428/319.7
[58] Field of Search ............... 428/316.6, 317.1, 317.7, 428/319.7, 159, 166, 198, 319.3, 246, 248, 252, 286, 287

[56] References Cited

U.S. PATENT DOCUMENTS

| | | | |
|---|---|---|---|
| 2,064,327 | 12/1936 | Upson | 428/282 |
| 2,142,463 | 1/1939 | Upson | 296/211 |
| 2,642,920 | 6/1953 | Simon et al. | 156/78 |
| 2,768,026 | 10/1956 | Stephens et al. | 98/2.15 |
| 2,879,105 | 3/1959 | Stahl | 296/214 |
| 3,037,897 | 6/1962 | Pelley | 156/78 |
| 3,042,446 | 7/1962 | Stahl | 428/318.4 |
| 3,252,732 | 5/1966 | Squier | 428/319.9 |
| 3,355,535 | 11/1967 | Hain et al. | 428/317.1 |
| 3,446,685 | 5/1969 | Goldstone et al. | 428/319.7 |
| 3,503,845 | 3/1970 | Hollatz et al. | 428/250 |
| 3,506,532 | 4/1970 | Bock et al. | 428/316.6 |
| 3,531,367 | 9/1970 | Karsten | 428/317.7 |
| 3,546,060 | 5/1957 | Hoppe et al. | 156/78 |
| 3,565,746 | 2/1971 | Stevens | 428/316.6 |
| 3,620,906 | 11/1971 | Hannes | 428/441 |
| 3,671,355 | 6/1972 | Paymal | 428/319.1 |
| 3,755,063 | 8/1973 | Massey et al. | 428/316.6 |
| 3,817,818 | 6/1974 | Riding et al. | 428/224 |
| 3,867,240 | 2/1975 | Doerfling | 428/71 |
| 3,869,337 | 4/1975 | Hoppe et al. | 156/78 |
| 3,873,654 | 3/1975 | Smith | 428/317.7 |
| 3,953,632 | 4/1976 | Robinson | 428/95 |
| 3,966,526 | 6/1976 | Doerfling | 156/224 |
| 4,002,367 | 1/1977 | Thomas | 296/211 |
| 4,020,207 | 4/1977 | Alfter et al. | 428/138 |
| 4,039,709 | 8/1977 | Newman | 428/159 |
| 4,053,670 | 10/1977 | LePoutre | 428/156 |
| 4,102,975 | 7/1978 | Doerer | 264/322 |
| 4,131,702 | 12/1978 | Alfter et al. | 428/76 |
| 4,172,918 | 10/1979 | Doerer | 428/174 |
| 4,188,440 | 2/1980 | Doerer | 428/316.6 |
| 4,211,590 | 7/1980 | Steward et al. | 156/79 |
| 4,256,797 | 3/1981 | Stamper et al. | 428/224 |
| 4,303,456 | 12/1981 | Schmuck et al. | 156/78 |
| 4,327,049 | 4/1982 | Miller | 264/138 |
| 4,330,584 | 5/1982 | Doerer | 428/91 |
| 4,363,848 | 12/1982 | LeDuc et al. | 428/286 |
| 4,411,949 | 10/1983 | Snider et al. | 428/304.4 |
| 4,476,183 | 10/1984 | Holtrop et al. | 428/316.6 |
| 4,479,992 | 10/1984 | Haeeseker et al. | 428/116 |
| 4,489,126 | 12/1984 | Holtrop et al. | 428/319.7 |
| 4,529,641 | 7/1985 | Holtrop et al. | 428/319.7 |
| 4,531,994 | 7/1985 | Holtrop et al. | 428/319.7 |
| 4,621,013 | 11/1986 | Holtrop et al. | 428/319.7 |

FOREIGN PATENT DOCUMENTS

| | | | |
|---|---|---|---|
| 891943 | 3/1962 | United Kingdom | 428/296 |
| 970070 | 9/1964 | United Kingdom | 428/288 |
| 1128611 | 9/1968 | United Kingdom | 428/316.6 |
| 1149305 | 4/1969 | United Kingdom | 428/319.7 |

*Primary Examiner*—William J. Van Balen
*Attorney, Agent, or Firm*—Flynn, Thiel, Boutell & Tanis

[57] ABSTRACT

A thermoformable composite article comprises a core layer made of a synthetic resin foam, a pair of adhesive layers in contact with the opposite, upper and lower surfaces of the core layer, and a pair of fabric layers superposed on the opposite upper and lower surfaces of the core layer, the fabric layers being bonded to the core layer by the adhesive layers. At least one of the fabric layers is made of a non-woven fabric which has been impregnated with a thermoplastic or thermosetting resin. The thermoformable composite articles of the present invention are useful as liners for automotive interiors.

10 Claims, 8 Drawing Figures

THERMOFORMABLE COMPOSITE ARTICLES

FIELD OF THE INVENTION

This invention relates to a thermoformable composite article, particularly a board, comprising a pair of fabric layers superposed on and adhered to opposite sides of a foam core made of a synthetic resin. At least one of the fabric layers is a non-woven fabric impregnated with a synthetic resin. Such thermoformable articles are useful, for example, as liners for automobile interior.

BACKGROUND OF THE INVENTION

Various materials have been used as liners for automotive interiors, but there is an increasing demand for liner materials which can be readily installed and have high sound absorption ability. Materials such as fiberglass and hardboard have been used as headliners, but headliners made of these materials are relatively heavy and difficult to install. Recently, thermoformable headliners made of a plastic foam, such as styrene-maleic anhydride resin foam, have been developed. Such headliners represent an improvement but do not have sufficient sound-absorbing ability.

A variety of composite articles wherein a fabric layer is superposed on a synthetic resin foam layer are known, but such articles are typically used for other purposes. For example, Martel U.S. Pat. No. 3,876,491 discloses a synthetic suede product formed of a thermoplastic foam adhered to a fibrous substrate, wherein the foam is treated to have the surface characteristics of natural suede. Smith U.S. Pat. No. 3,546,832 discloses a precast decorative panel wherein a core comprising a cured mixture of a thermoset resin and aggregates is formed in contact with an open mesh, such as a mat of glass fibers. Weissenfels U.S. Pat. No. 3,915,772 discloses sheets or slabs of phenolic resin foam having a covering material adhered to at least one side thereof, which covering material is a fiber-containing material which is impregnated into at least one side of the foam. Such slabs having a covering material thereon are used for outside insulation. The covering material of Weissenfels may further be impregnated with a liquid comprising a phenol-aldehyde condensate, a polyamide, a butadiene polymer, or a polyvinylacetal. Similarly, Moss U.S. Pat. No. 3,968,300 discloses a building panel comprising a facing sheet made of materials such as kraft paper, aluminum, asphalt and impregnated felts, which facing sheet is superposed on a cellular material made of a phenolic resin. Westfall U.S. Pat. No. 4,056,646 discloses a pliable, fiber-reinforced, flocked latex sheet comprising a fibrous sheet or scrim base material, a foamed latex and a flocking, suitable for use as a cloth-like material. The foregoing patents indicate that the properties of a composite article including one or more fabric layers superposed on a foam core vary widely depending on the particular materials selected for the foam core. Such composite articles can be thick and of high rigidity and hence useful as building materials, or can be thin, flexible, and soft, and thus useful as cloth substitutes.

A large number of fabrics useful as coverings for core materials are known. LePoutre U.S. Pat. No. 4,053,670 discloses non-woven fabrics made by impregnating a web of non-woven fibers with a chemical binder capable of thermal polymerization, the binder serving to increase the mechanical strength of the fabric. In a different context, Birmingham U.S. Pat. No. 2,343,740 discloses a fibrous sheet impregnated with a binder which is superposed on the surface of a wood panel in order to mask imperfections in the wood. The foregoing patents demonstrate typical known uses for resin impregnated fabrics, particularly non-woven fabrics.

SUMMARY OF THE INVENTION

The thermoformable composite article of the present invention comprises, as essential elements, a core layer made of a thermoformable synthetic resin foam, a pair of fabric layers disposed on the opposite, upper and lower sides of the core layer, at least one of these fabric layers being made of a non-woven fabric impregnated with a thermoplastic or thermosetting resin, and a pair of adhesive layers in contact with the opposite, upper and lower surfaces of the core layer, which adhesive layers effectively bond the fabric layers to the core layer. The synthetic resin foam used to form the core layer of the composite article according to the invention can be rigid or flexible, but it must be thermoformable at an elevated temperature. Specifically, the synthetic resin used to form the foam core layer must be thermoformable at an elevated temperature above the softening point of the resin, but below the melting point thereof. The thermoplastic or thermosetting resin impregnated in the non-woven fabric similarly renders the impregnated non-woven fabric layer thermoformable.

An object of the present invention is to provide a thermoformable composite article which can be thermoformed by heating the composite article, thereby rendering the composite article flexible, then conforming the composite article to a desired shape, and then cooling the composite article, whereby the article then retains the shape imparted by the thermoforming process.

It is a further object of the present invention to provide a thermoformable composite article which is high in sound absorbing ability.

Such an article is useful as an automotive vehicle interior liner, since the composite article can be thermoformed as needed to fit the contour of an automotive vehicle interior, and once in place can render the vehicle interior quieter by absorption of engine noise, particularly noise at the dominant frequency produced by operation of the vehicle.

In addition, the use of the non-woven fabric layer or layers makes it easier to thermoform the article, increases the bursting and tensile strength of the article, reduces warpage and provides good dimensional stability, modulus of rupture, modulus of elasticity and stiffness modulus.

BRIEF DESCRIPTION OF THE DRAWINGS

In the accompanying drawings:

The foregoing drawings are not to scale. However, FIGS. 1 and 2 are substantially proportional and show the changes in the thicknesses of the layers that occur when the composite article is assembled.

DETAILED DESCRIPTION

Figure 1:
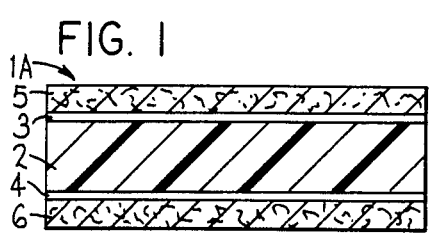
FIG. 1 is a cross-sectional view of a first embodiment of a composite article of the present invention.

FIG. 1 illustrates the simplest embodiment of the present invention. The composite article 1A shown in FIG. 1 comprises a synthetic resin foam core layer 2, the upper and lower surfaces of which are in contact with and adhered to a pair of adhesive layers 3 and 4, respectively. The adhesive layers 3 and 4 aid in adhering fabric layers 5 and 6, respectively, to the opposite faces of the foam core 2. At least one of the fabric layers 5 and 6 is made from a non-woven fabric impregnated with a thermoplastic or thermosetting resin. In the embodiment shown in FIG. 1, both layers 5 and 6 are made of such a non-woven fabric impregnated with a thermoplastic or thermosetting resin.

Selection of appropriate materials for the layers of the composite articles according to the present invention is essential to achieving a satisfactory thermoformable composite article. The foam core 2 can be made of any well-known synthetic resin capable of forming a thermoformable foam. Preferred synthetic resins useful for this purpose include polystyrene and copolymers thereof, but other foam-forming synthetic resins, such as polyvinyl chloride, polyethylene, polyurethane, polyisocyanurate, polyphenol, epoxy and silicon resins, cellulose acetate, and various polyolefins can also be used, depending upon the desired application. Styrene-maleic anhydride copolymers are particularly preferred for use as the foam-forming synthetic resin because these copolymers have higher softening and melting points than polystyrenes. Conventional additives, such as foam controlling agents, pigments, wetting agents, bases to lower the pH, thickeners, resins such as melamine-formaldehyde resin, and fire retardants, can be incorporated into the foam-forming synthetic resin.

The foam core 2 is typically formed by a two-stage process. The first stage is a conventional extrusion process for molding polystyrene copolymers in order to form a sheet- or board-like extruded product. A blowing agent is incorporated into the initially formed extruded product so that the extruded product is expandable. An air field can be used to form an integral skin on the extruded product. Formation of the foam core 2 is completed in the second stage by effecting expansion of the extruded product.

Figure 2:
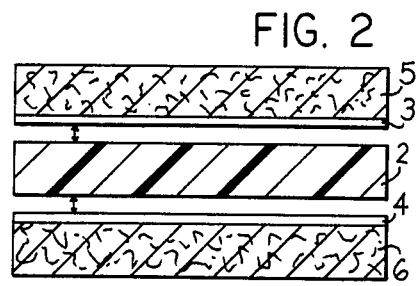
FIG. 2 is a cross-sectional view of the components used to form the composite article shown in FIG. 1.

FIG. 2 illustrates the same components as shown in FIG. 1, before these components are bonded together to form the composite article. According to the preferred method of the present invention, one or both of the fabric layers 5 and 6 are previously impregnated with a thermoplastic or thermosetting resin, and are then coated on one face thereof with a heat-activated adhesive whereby to form the adhesive layers 3 and 4 which are integral with the fabric layers 5 and 6, respectively. The foam core 2 is then interposed between the adhesive-coated faces of the fabric layers 5 and 6, as shown in FIG. 2, and the resulting assembly is pressed together under heat and pressure to bond the layers together by means of the adhesive and form the unitary composite article. During this laminating process, the foam core 2 preferably undergoes expansion so that its thickness increases up to 100 percent of its original dimension. Thus, comparing FIG. 2 with FIG. 1, it will be observed that the thickness of the core layer 2 of the unitary composite article (FIG. 1) is greater than the thickness of core layer 2 prior to forming the composite article. This expansion causes the cell size of the foam core 2 to increase and its density correspondingly to decrease. The bonding step is conducted at an elevated temperature sufficient to effect bonding of the adhesive layers 3 and 4 to the foam core 2 and to cause foaming of the foam core 2.

If a thermosetting resin is used as the resin for impregnating the fabric layers 5 and 6, the temperature employed in the bonding step is not so high as to completely thermoset this resin; rather the resin is a B-stage resin. Thus, by heating the thus-formed composite article to a still higher temperature at a later time, thermoforming can be carried out wherein the resin impregnating the fabric layers 5 and 6 undergoes cross-linking and is thereby completely thermoset (C-stage resin).

In a modification of the foregoing process, the adhesive layers 3 and 4 can be formed on the opposite upper and lower faces of the foam core 2 prior to the bonding step, rather than on the fabric layers 5 and 6.

When a styrene-maleic anhydride copolymer is used as the synthetic resin foam core 2, such as a Dylark resin produced by Arco Chemical Company, particularly Dylark 232 resin, the step of bonding the fabric layers 5 and 6 to the core 2 is carried out at a temperature in the range of 245°–265° F., at a pressure of 35–40 pounds per square inch. The assembly of the fabric layers and foam core is then bump-pressed for about 8 to 12 seconds in order to remove moisture therefrom. The resulting composite article is then allowed to cool.

The foam core 2 is preferably a relatively rigid structural foam, as determined by the fact that it would rupture if it were substantially bent, particularly if it were bent around a 2.5 cm mandrel at a rate of 1 lap per 5 seconds at 15°–25° C. The foam core 2 has a density in the range of 3.5–7.5 pounds per cubic foot, after expansion. The foam core 2 generally has a thickness in the range of 0.05 to 0.5 inches, preferably 0.1 to 0.3 inches, after expansion. When the foam core 2 is made from styrene-maleic anhydride copolymer, the most desirable density is 5–5.5 pounds per cubic foot after expansion. The cell size of the foam core 2 is regulated during the expansion step. An average of 5–10 cells per 0.08 inch across the width of the foam core 2, particularly 8 cells per 0.08 inch, is preferred. However, a broad range of from 5–25 cells per 0.08 inch can be employed. Generally, decreasing the average cell size increases the flexibility of the foam, such that at 20–25 cells per 0.08 inch, the foam core of the present invention becomes flexible.

The flexibility or rigidity of the foam core 2 largely determines the structural properties of the resulting composite article. Although the composite article of the present invention can be relatively flexible, embodiments of the invention wherein the foam core is substantially rigid are particularly useful. If the composite article is to be used as an automotive liner, the foam core 2 should not sag at temperatures of less than 225° F. In other words, the Vicat softening point of the resin used to make the foam core 2 should be higher than 225° F. Polystyrene foams generally do not have a sufficiently high softening point to pass such a sag test, but styrene-maleic anhydride copolymers are capable of passing this test.

The composite article of the present invention is usually formed as a flat sheet or board.

The fabric layers 5 and 6 can be made from any known natural or synthetic fibers or fiber blends. Usable synthetic fibers include polyester, nylon and acrylic fibers. A non-woven polyester fabric made of 1.5–25 denier fibers is preferred. A fiber fineness range of 1.5–10 denier improves the acoustic properties of the polyester fabric. The fabric layers 5 and 6 generally have a weight per unit area in the range of 1–12 ounces per square foot, and a thickness in the range of 0.1–0.8 inches. The thickness of the fabric layers 5 and 6 is reduced by the press bonding process used to form the composite article. A comparison of FIGS. 1 and 2 shows that the thicknesses of the fabric layers 5 and 6 are reduced by the press bonding process. The preferred initial thickness range for the fabric layers 5 and 6 is 0.25–0.5 inches.

The fabric layers 5 and 6 are previously impregnated with the thermosetting or thermoplastic resin before being brought into contact with and bonded to the foam core 2 as described above. Thermoplastic and thermosetting resins useful for this purpose include acrylics, styrenes, vinyl acetate, vinyl acetateacrylics, phenolics and melamines. The impregnated fabrics can be prepared by dissolving the resin in a solvent and then treating the fabrics with the resin-solvent system by spraying, coating or the like. After the fabrics are thoroughly impregnated, the solvent is removed by drying. A preferred resin-solvent system is an ethylene-vinyl acetate copolymer dissolved in water. The weight ratio of resin solids to weight of fabric per unit area, is desirably in the range of from 1:2 to 3:2, especially 1:1. It is generally useful to limit the total weight of the resin-impregnated fabric to a maximum of 16 ounces per square yard, particularly 5–8 ounces per square yard. A fire retardant, such as aluminum trihydrate, can be added to the resin solution so as to be incorporated into the fabric layers.

A thermosetting resin is most useful as the resin to be impregnated into the fabric layers 5 and 6. Such a thermosetting resin remains in the B-stage during the impregnation process, and is not actually cured until the composite article is subsequently finally thermoformed. If a non-woven fabric layer is used on only one side of the foam core 2, the other fabric layer can be made of any type of fabric, woven or non-woven, and need not be impregnated with the thermoplastic or thermosetting resin. Extensible paper can be used as the other fabric layer in such a case.

The adhesive layers 4 and 5 are made of a heat-activated glue effective to bond the resin-impregnated fabric layers 5 and 6 to the foam core 2. Any conventional heat-activated adhesive which is compatible with the other components can be employed. Preferred adhesives for the layers 4 and 5 include acrylic and styrene-butadiene-type adhesives. The adhesive layers are applied according to conventional techniques to either the foam core 2 or the fabric layers 5 and 6 so that the foregoing components will be effectively bonded together when pressed together under heating.

The finished composite article according to the present invention can be thermoformed by a procedure such as the following. The composite article is cut and shaped to a desired form, then preheated by stagewise preheating through temperatures of 150° F., 250° F. and finally 300° F. maximum. The foam core 2 is softened and rendered flexible by such heating. The sheet is placed in a cold (120°–160° F.) die, and then thermoformed.

Figure 3:
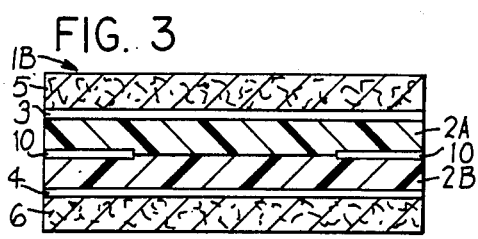
FIG. 3 is a cross-sectional view of a composite article according to a second embodiment of the present invention.
Figure 4:
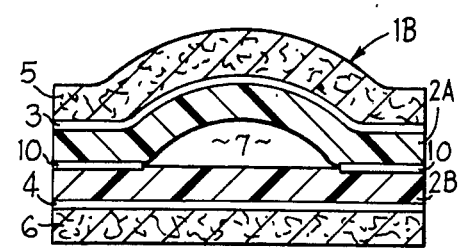
FIG. 4 is a cross-sectional view of the composite article shown in FIG. 3, after voids have been formed therein.
Figure 5:
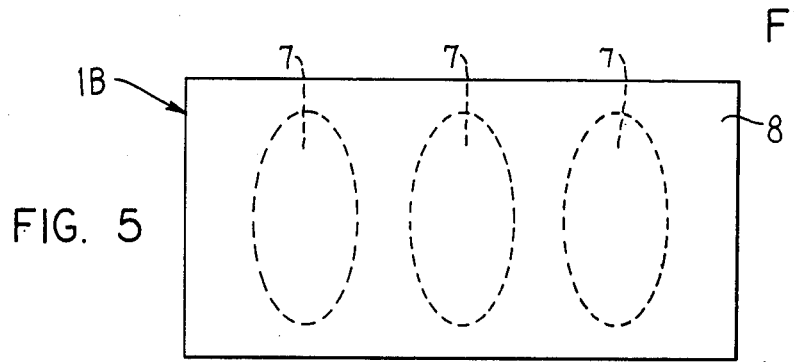
FIG. 5 is a top view of the composite article shown in FIG. 4.

FIGS. 3, 4 and 5 show a second embodiment of the present invention wherein the foam core 2 of the composite article 1B is subdivided into a pair of separate foam cores 2A and 2B superposed directly on one another. Adhesive layer 10 is formed between the cores 2A and 2B. The adhesive layer 10 is essentially the same as the layers 3 and 4, but unlike these layers, the layer 10 has a series of gaps therein, i.e., it is discontinuous. During thermoforming a vacuum forming method can be used to form voids 7 within the composite material 1B, which voids 7 correspond to areas where no adhesive layer 10 is present. In the case of an automobile roof liner, the voids 7 are large, roughly oval spaces formed at positions corresponding to compartments separated by roof stringers. The resulting liner has improved sound absorbing ability. A matrix region 8 surrounds the void regions 7. In the region 8, the layers 2A and 2B are not substantially separated during thermoforming.

Figure 6:
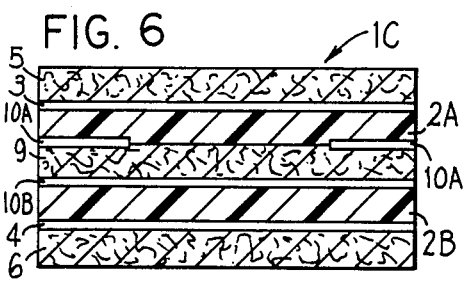
FIG. 6 is a cross-sectional view of a composite article according to a third embodiment of the present invention.
Figure 7:
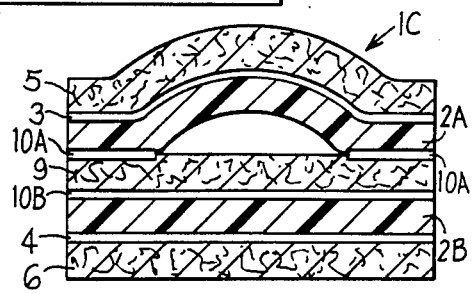
FIG. 7 is a cross-sectional view of the composite article shown in FIG. 6, after the formation of voids therein.

FIGS. 6 and 7 show a composite article 1C according to a third embodiment of the present invention. In this embodiment, the separate foam core layers 2A and 2B have an additional fabric layer 9 and heat-activated adhesive layers 10A and 10B interposed therebetween. In this embodiment, at least one of the fabric layers 5, 6 and 9 must be the non-woven fabric layer impregnated with the thermoplastic or thermosetting resin. Layer 10A is essentially the same as the layer 10 of the preceding embodiment, and allows the voids 7 to form between the foam core 2A and the fabric layer 9. The adhesive layer 10B is a continuous layer essentially the same as the layers 3 and 4. The additional fabric layer 9 further increases the sound absorption capacity of the composite article.

Figure 8:
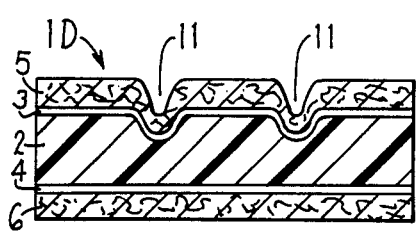
FIG. 8 is a cross-sectional view of the composite article shown in FIG. 1, after the composite article has been embossed.

FIG. 8 illustrates a fourth embodiment of the present invention wherein the composite article as shown in FIG. 1 is embossed to form a composite article 1D having a plurality of depressions 11 in one face thereof. The size of the depressions can be varied in order to absorb the dominant sound frequency produced by the vehicle. Sound absorption is thus improved over the non-embossed embodiment shown in FIG. 1.

EXAMPLE

A pair of non-woven fabric layers made of Hoechst 90 polyester having a fiber fineness of 6 denier, a H weight per unit area of 6 ounces/ft$^2$ and a thickness of approximately ⅛ inch were saturated with an ehtylenevinyl vinyl acetate copolymer emulsion (Union Chemical, Amsco-Res 1170, 45% solids in water). The layers were then dried, whereby a pair of thermosetting resin-impregnated polyester non-woven layers were prepared. The dried layers were then each coated on one side with a layer of a polyvinyl chloride adhesive (HC 6990, a product of Hughes Chemical Co., 55% total solids, 9.2 lbs./gallon).

A foam core was formed from a rigid foam of styrene-maleic anhydride copolymer (Dylark 232, a product of Arco Chemical Co.) by a conventional extrusion process. The foam core had a thickness of about 0.094 inches, and was in the form of a flat slab.

To form the coated fabric layers and foam core into an integral unit, the foam core was interposed between the adhesive-coated faces of the layers, and the resulting assembly was subjected to a laminating procedure. The liner-core assembly was heated to 265° F. and bump-pressed by a pair of platens under a pressure of 50 tons per 25 square feet for 10 seconds, whereby moisture was removed and the layers were effectively bonded to the foam core. During laminating the foam core underwent foaming and increased in thickness by approximately 100% to about 0.19 inches. The fabric layers were decreased in thickness and made more dense by the bonding process, such that the thickness of the bonded article, after cooling, was about 0.28 inches. After laminating, the composite article was allowed to cool. In the finished composite article, the foam core had a density of 5 lbs./ft$^3$ and consisted of closed cells, there being about 8 cells per 0.08 inch across the width of the foam core.

The finished article was essentially a rigid board suitable for infrared thermoforming upon heating to about 300° F.

Although particular preferred embodiments of the invention have been disclosed in detail for illustrative purposes, it will be recognized that variations or modifications of the disclosed invention, including the use of additional layers of fabric, adhesive or synthetic resin foam, lie within the scope of the present invention.

The embodiments of the invention in which an exclusive property or privilege is claimed are defined as follows:

1. A thermoformable composite article, comprising:
   a core layer consisting essentially of a theroformable synthetic resin foam having a softening point higher than 225° F. and a density in the range of 3.5 to 7.5 pounds per cubic foot, said foam consisting essentially of closed cells and having an average of from 5 to 25 cells per 0.08 inch across the width of said core layer, said synthetic resin foam consisting essentially of a styrene-maleic anhydride copolymer.
   a pair of first and second adhesive layers adhered to the opposite, upper and lower faces of said core layer, respectively; and
   a pair of fabric layers superposed on the opposite upper and lower faces of said core layer, which fabric layers are bonded to said surface of said core layer by said adhesive layers, at least one of said fabric layers consisting essentially of a non-woven fabric, with fibers of a fineness in the range of 1.5 to 25 denier, impregnated with a thermoplastic or an uncrosslinked thermosetting synthetic resin, said thermoplastic or thermosetting resin consisting essentially of ethylene-polyvinylacetate resin, and said one of said fabric layers consisting essentially of non-woven polyester fibers.

2. A thermoformable composite article, comprising:
   a core layer consisting essentially of a thermoformable synthetic resin foam, said foam consisting essentially of closed cells, said core layer comprising a pair of sub-layers of said synthetic resin foam, which sub-layers are in face-to-face contact with each other but are not substantially bonded to each other in a plurality of spaced-apart areas so that said sub-layers can be separated over said areas during thermoforming to form a plurality of voids in said core layers between said sublayers; said non-bonded areas being surrounded by continuous adhesively bonded areas so that the non-bonded areas can be shaped into closed chamber surrounded by continuous adhesively bonded areas during subsequent thermoforming;
   a pair of first and second adhesive layers adhered to the opposite, upper and lower faces of said core layer, respectively; and
   a pair of fabric layers superposed on the opposite upper and lower faces of said core layer, which fabric layers are bonded to said faces of said core layer by said adhesive layers, at least one of said fabric layers consisting essentially of a non-woven fabric impregnated with a thermoplastic or an uncrosslinked thermosetting synthetic resin.

3. A composite article as claimed in claim 2, wherein said thermoplastic or thermosetting resin consists essentially of uncrosslinked thermosetting resin which undergoes crosslinking during thermoforming of said composite article.

4. A composite article as claimed in claim 2, wherein said synthetic resin foam has a softening point greater than 225° F. and a density in the range of 3.5 to 7.5 pounds per cubic foot, said foam consisting essentially of closed cells and having an average of from 5 to 25 cells per 0.08 inch across the width of said core layer.

5. A composite article as claimed in claim 2, wherein said synthetic resin foam consists essentially of a styrene-maleic anhydride copolymer, said thermoplastic or thermosetting resin consists essentially of ethylene-polyvinylacetate resin, and said one of said fabric layers consists essentially of non-woven polyester fibers having finenesses in the range of 1.5–25 denier.

6. A composite article as claimed in claim 2, further comprising a third adhesive layer interposed between said pair of sub-layers of said synthetic foam and effective to bond together said pair of sub-layers at positions other than said non-bonded areas.

7. A laminated article, comprising:
   first and second foam layers made of synthetic resin foam, said first and second foam layers having mutually opposed inner surfaces which are bonded in face-to-face contact with each other in selected bonded areas of said foam layers, said inner surfaces of said first and second foam layers being free of bonded relationship to each other in other, spaced-apart, non-bonded areas of said foam layers, said inner surface of said first foam layer being displaced away from said inner surface of said second foam layer in said non-bonded areas to define voids between said inner surfaces of said first and second foam layers in said non-bonded areas, the assembly of said first and second foam layers defining a foam core, said foam core having mutually remote outer surfaces;
   a pair of fabric layers respectively bonded to said outer surfaces of said foam core, at least one of said fabric layers consisting essentially of non-woven fabric impregnated with a synthetic resin.

8. A laminated article as claimed in claim 7 in which said first foam layer is arched away from said second foam layer in said non-bonded areas and the fabric layer adjacent to said first foam layer is similarly arched in those areas.

9. A laminated article as claimed in claim 7 in which each of said unbonded areas is substantially surrounded by said bonded areas so that each void is substantially closed.

10. A rigid, thermoformable, structural laminate comprising:

a substantially rigid, thermoformable, foam core comprising a pair of closed-cell, thermoplastic, extruded, synthetic resin foam layers containing blowing agent therein, said foam layers having adjacent surfaces which are in face-to-face contact with each other and are adhesively united to each other by heat-activated adhesive over substantial areas of the contacting surfaces thereof, there being a plurality of intermediate, spaced-apart zones in which said contacting surfaces are not adhesively united, which zones are each surrounded by continuous adhesively united areas, so that in each zone one of said foam layers is free to move away from the other of said foam layers to form a closed chamber between said foam layers;

a pair of non-woven fabric layers adhesively united by heat-activated adhesive to the mutually remote surfaces of said foam layers, respectively, said non-woven fabric layers being impregnated with a thermoformable synthetic resin, the fabric layer united to said one foam layer being free to move with said one foam layer away from said other foam layer, said foam layers and said fabric layers each being in the form of a thin sheet of uniform thickness and said foam layers and said fabric layers being parallel to each other, said laminate being thermoformable so that in a subsequent thermoforming operation said one foam layer and the non-woven fabric layer adhesively adhered thereto can be moved away from said other foam layer and the non-woven fabric layer adhesively adhered thereto in said zones whereby to form said closed chambers.

* * * * *